(12) United States Patent
Upadhyay et al.

(10) Patent No.: US 11,062,621 B2
(45) Date of Patent: Jul. 13, 2021

(54) DETERMINING PHONETIC SIMILARITY USING MACHINE LEARNING

(71) Applicant: PayPal, Inc., San Jose, CA (US)

(72) Inventors: Rushik Upadhyay, Milpitas, CA (US);
Dhamodharan Lakshmipathy, San Jose, CA (US); Nandhini Ramesh, San Jose, CA (US); Aditya Kaulagi, Singapore (SG)

(73) Assignee: PayPal, Inc., San Jose, CA (US)

( * ) Notice: Subject to any disclaimer, the term of this patent is extended or adjusted under 35 U.S.C. 154(b) by 142 days.

(21) Appl. No.: 16/232,619

(22) Filed: Dec. 26, 2018

(65) Prior Publication Data
US 2020/0211416 A1 Jul. 2, 2020

(51) Int. Cl.
*G09B 19/06* (2006.01)
*G06N 20/00* (2019.01)
*G06K 9/62* (2006.01)
*G06F 40/263* (2020.01)

(52) U.S. Cl.
CPC ........... *G09B 19/06* (2013.01); *G06F 40/263* (2020.01); *G06K 9/6215* (2013.01); *G06N 20/00* (2019.01)

(58) Field of Classification Search
CPC ....... G10L 15/10; G10L 15/19; G10L 15/005; G06F 17/28; G06F 17/30
See application file for complete search history.

(56) References Cited

U.S. PATENT DOCUMENTS

| | | | |
|---|---|---|---|
| 6,581,034 B1* | 6/2003 | Choi | G10L 15/10 704/238 |
| 7,010,487 B1 | 3/2006 | Choi et al. | |
| 8,005,664 B2* | 8/2011 | Hanumanthappa | G06F 40/151 704/4 |
| 8,433,556 B2* | 4/2013 | Fraser | G06F 40/45 704/4 |
| 8,494,855 B1* | 7/2013 | Khosla | G10L 15/06 704/251 |
| 8,655,643 B2 | 2/2014 | Haddad et al. | |
| 8,731,901 B2 | 5/2014 | Srihari et al. | |

(Continued)

OTHER PUBLICATIONS

Likic, V., "The Needleman-Wunsch algorithm for sequence alignment", 7th Melbourne Bioinformatics Course. https://www.cs.sjsu.edu/~aid/cs152/NeedlemanWunsch.pdf (Year: 2008).*

*Primary Examiner* — Anne L Thomas-Homescu
(74) *Attorney, Agent, or Firm* — Haynes and Boone, LLP

(57) ABSTRACT

Techniques are disclosed relating to determining phonetic similarity using machine learning. The techniques include accessing training data that includes a first set of words of a native language and a second set of words corresponding to verified transliterations of the first set of words from the native language to a target language. Further, they include generating a set of new transliterations of the first set of words from the native language to the target language and storing comparison information based on a comparison between words from the second set of words and word from the set of new transliterations of the first set of words. Finally, a similarity score is determined between a first word of the target language and a second word of the target language based on the comparison information.

20 Claims, 6 Drawing Sheets

(56) References Cited

U.S. PATENT DOCUMENTS

| | | | |
|---|---|---|---|
| 8,996,356 B1* | 3/2015 | Yang | G06F 3/04886 704/4 |
| 9,934,203 B2* | 4/2018 | Bahgat | G06F 40/44 |
| 10,452,897 B1* | 10/2019 | Benkreira | G06K 9/00288 |
| 2002/0032549 A1* | 3/2002 | Axelrod | G10L 15/01 703/2 |
| 2003/0191626 A1* | 10/2003 | Al-Onaizan | G06F 40/295 704/8 |
| 2004/0102958 A1* | 5/2004 | Anderson, IV | G06F 40/186 704/4 |
| 2007/0011132 A1* | 1/2007 | Zhou | G06F 16/951 |
| 2007/0085716 A1* | 4/2007 | Bar-Yossef | G06F 16/90344 341/87 |
| 2007/0124133 A1* | 5/2007 | Wang | G06F 40/44 704/10 |
| 2007/0150443 A1* | 6/2007 | Bergholz | G06F 16/258 |
| 2008/0221866 A1* | 9/2008 | Katragadda | G06F 40/53 704/8 |
| 2010/0094614 A1* | 4/2010 | Bilac | G06F 40/53 704/2 |
| 2010/0106484 A1* | 4/2010 | U | G06F 40/45 704/5 |
| 2011/0099000 A1* | 4/2011 | Rai | G06F 40/53 704/2 |
| 2011/0137636 A1* | 6/2011 | Srihari | G06F 40/53 704/2 |
| 2011/0202876 A1* | 8/2011 | Badger | G06F 40/166 715/816 |
| 2012/0041751 A1* | 2/2012 | Elfeky | G06F 40/129 704/2 |
| 2013/0275117 A1* | 10/2013 | Winer | G06F 40/53 704/3 |
| 2014/0012563 A1* | 1/2014 | Caskey | G06F 40/58 704/2 |
| 2015/0064664 A1* | 3/2015 | Gobuty | G09B 19/08 434/157 |
| 2015/0088487 A1* | 3/2015 | Yang | G06F 40/53 704/3 |
| 2016/0163310 A1* | 6/2016 | Lee | G10L 25/30 704/232 |
| 2017/0147696 A1* | 5/2017 | Evnine | G06F 16/9535 |
| 2018/0143965 A1* | 5/2018 | Willson | G06F 40/274 |
| 2018/0285326 A1* | 10/2018 | Goyal | G06F 40/166 |
| 2020/0082808 A1* | 3/2020 | Li | G10L 15/10 |
| 2020/0160836 A1* | 5/2020 | Chen | G10L 15/063 |
| 2020/0193977 A1* | 6/2020 | Ramabhadran | G10L 15/19 |

* cited by examiner

DETERMINING PHONETIC SIMILARITY USING MACHINE LEARNING

BACKGROUND

Technical Field

This disclosure relates generally to matching textual information and, more specifically, to determining phonetic similarity between words using machine learning.

Description of the Related Art

The ability to match textual information is a frequent endeavor among various computer systems today. For instance, Internet search algorithms attempt to match input text from a user with webpages that contain similar text to the input text. Numerous other contexts also exist in which a system attempts to match an input text with other text stored in a database. However, in cases where the input text corresponds to a transliteration of an original word from a native language, typical matching algorithms can overlook likely matches for the input text. This is because there may exist various ways to transliterate the original word, thereby producing different transliterations.

Figure 1:
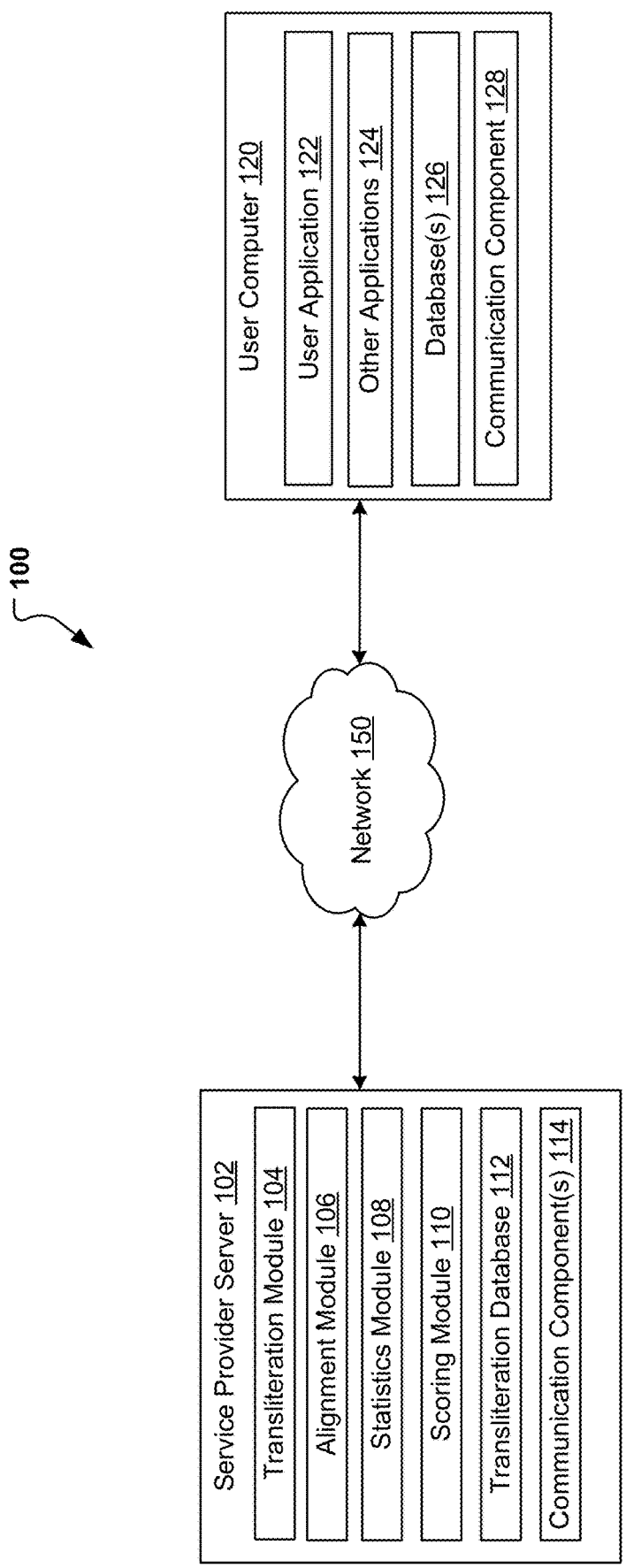
FIG. 1 is a block diagram illustrating an example system that facilitates determining phonetic similarity using machine learning, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "alignment module configured to perform a sequence alignment algorithm" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for determining phonetic similarity between transliterated words using statistical analysis and machine learning. In certain embodiments, a service provider server may include a transliteration module, an alignment module, and a scoring module. The service provider server may receive and/or otherwise access a transliteration table storing various sets of words. Each entry in the table may include a word of a native language, a first transliteration of the word to a second language, and a second transliteration of the word to the second language. The first transliteration of the word may be a verified transliteration that is known to be a valid transliteration of the word. The second transliteration of the word may be a transliteration of the word that is generated by the transliteration module. The second transliteration may or may not be the same as the first transliteration. Thus, in other words, the table may store a first set of words of the native language, a second set of words that are verified transliterations of the first set of words, and a third set of words that are transliterations of the first set of words that have been generated by the transliteration module. It will be appreciated that while the disclosure references the use of a table, any other type of data structure can also be used to store the three sets of words.

The information included in the transliteration table may be used a training data to train a phonetic matching algorithm that determines a similarity score between two words. For example, for each word of the native language in the transliteration table, the service provider server may be configured to determine whether there are any differences between the first transliteration and the second transliteration of the word. If the service provider server determines that one or more differences do exist between the first transliteration and the second transliteration, the service provider server stores the differences in a database. For instance, each transliteration pair (e.g., the first transliteration and the second transliteration for a particular word of the native language) may be provided to the alignment module. The alignment module may align the first transliteration and the second transliteration according to a sequence alignment algorithm. In particular embodiments, the sequence alignment algorithm may be the Needlemen-Wunsch sequence alignment algorithm.

After aligning the first and second transliterations, the alignment module may determine whether the first transliteration is different from the second transliteration. If there are differences, the alignment module may identify a first substring from the first transliteration that is different from a second substring of the second transliteration. The first substring and the second substring may have the same substring length (number of characters). The alignment module may store the pair of the first substring and the second substring in a transliteration database. The transliteration database may maintain a count of the number of instances in which the pair of the first substring and the second substring have been identified as a difference between the two corresponding transliterations of each word of the first set of words of the native language. As such, the transliteration database may store multiple pairs of substrings, each having respective counts associated with them. Additionally, the transliteration database may also store, for each substring in each of the substrings pairs, a count of the number of words from the first set of verified transliteration or the second set of transliterations that include the substring. The information stored in the transliteration database may be collectively referred to as transliteration comparison information.

Subsequently, the service provider server may receive a request to determine a similarity between a first word and a second word. Both the first word and the second word may be words of the second language. The service provider server may be configured to determine whether there are any differences between the first word and the second word. For example, the alignment module may align the first word and the second according to the sequence alignment algorithm described above and compare the first word and the second word based on the alignment. Based on the comparison, the scoring module may determine a base scoring component value corresponding to the first word and the second word. In certain implementations, the scoring module may calculate an edit distance between the first word and the second word and use the edit distance as the base scoring component value.

Further, the scoring module, based on the comparison, identify a substring of the first word that is different from the substring of the second word. The scoring module may compare this substring pair with the transliteration comparison information stored in the transliteration database. Based on comparing the substring pair with the transliteration comparison information, the scoring module may calculate a weight and apply that weight to the base scoring component value. Using the base scoring component value, a final similarity score is determined between the first word and the second word.

Typical matching algorithms may use the edit distance as primary factor for determining a similarity score between two words. However, using only edit distance may be a relatively imprecise scoring method, as it may overestimate differences between words, especially two words of a particular language that are different transliterations of the same original word of a native language. Using the techniques described herein, a weight can be calculated and applied to a base scoring component value, such as the edit distance, that is determined based on the differences between the two words. As described above, the weight is determined based on transliteration comparison information stored in the transliteration database. In certain circumstances, applying the weight to the base scoring component value results in a final similarity score between the two words that is greater than a similarity score that would have resulted if the weight was not applied. Thus, applying the weight to the base scoring component value compensates for potential overestimation of differences between the two words.

FIG. 1 is a block diagram illustrating an example system 100 for determining phonetic similarity between words using statistical analysis and machine learning, according to some embodiments. In the illustrated embodiment, the system 100 includes a service provider server 102 in communication with a user computer 120 via a network 150. The service provider server 102 may implement a phonetic matching algorithm that determines a similarity score between two words. The phonetic matching algorithm may be used in various contexts.

For example, the phonetic matching algorithm may be used as part of a search algorithm. The service provider server 102 may receive an input text (e.g., a search term), and perform the phonetic matching algorithm to compare the input text with previously stored text data. Depending on the results of the phonetic matching algorithm, the service provider server 102 may determine if any of the previous stored text data matches the input text. In one embodiment, the search algorithm corresponds to an Internet search, and the input text is provided by the other computer 120. The service provider 102 performs the phonetic matching algorithm to identify webpages (if any) that include text data that matches the input text. More particularly, the service provider 102 may determine whether a similarity score between the text data of the webpages and the input text satisfies a score threshold. A match is identified if the score threshold is satisfied.

In another embodiment, the service provider server 120 analyzes payment transactions of a payment service to determine whether any users of the payment service (e.g., payors, payees, customers, merchants, etc.) is a bad actor. Bad actors may be individuals and/or organizations that are known to perpetrate fraud, terrorism, and/or other criminal or undesirable activities. To this end, the service provider server 102 may receive a set of names (stored in one or more electronic files) that are known to be bad actors (e.g., a blacklist provided by a government agency or other entity) and may monitor payment transactions of the payment service to determine whether any users of the payment service are included in the blacklist. For instance, for each payment transaction, the service provider server 120 may perform the phonetic matching algorithm with respect to the users associated with the payment transaction and the blacklist. Based on the phonetic matching algorithm, if the service provider server 102 determines one or more of the users are included in the blacklist, the service provider server 102 may decline the payment transaction, flag the identified user(s) and the payment transaction for law enforcement, and/or take other remedial action. For instance, the service provider 102 may, for each name associated with a user, determine whether a similarity score between the name and any of the names included in the blacklist satisfies a score threshold. A match is identified if the score threshold is satisfied.

It will be appreciated that the above examples are for illustrative purposes and that the phonetic matching algorithm can be implemented in various other contexts. In general, the phonetic matching algorithm can be used in any situation that involves a text search.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, the service provider server 102 may include a transliteration module 104, an alignment module 106, a statistics module 108, a scoring module 110, a transliteration database, and communication components 114. The components of the service provider 102 may communicate with each other to implement a phonetic text matching algorithm, as will be describe in more detail below.

The transliteration module 104 may be configured to perform transliterations of words of a native language to words of a second language. For instance, according to some embodiments, the transliteration module 104 may be configured to perform transliteration of Russian words to English words, though it will be appreciated that transliteration between words of other languages are also contemplated. Transliterations generated by the transliteration module 104 may be differentiated from verified transliterations, which are transliterations that are known to be valid. In certain embodiments, transliterations generated by the transliteration module 104 may be referred to as "new transliterations," although it will be appreciated that "new transliterations" can be transliterations generated by any source that is different from the source that generated verified transliterations.

The alignment module 106 may be configured to compare two transliterated words by aligning the words according to a sequence alignment algorithm. In certain embodiments, the sequence alignment algorithm is the Needlemen-Wunsch algorithm though it will be appreciated that other sequence alignment algorithms are also contemplated. Based aligning two words according to the sequence alignment algorithm potential differences (if there are any) between the two words can be identified. For example, after aligning the two words, an edit distance between the two words can be calculated. Edit distance may be calculated by counting the minimum number of operations needed to transform one of the two words into the other of the two words.

The statistics module 108 may be configured to determine various statistical information regarding the relationship between words of a native language, their verified transliterations, and transliterations of those words that are generated by the transliteration module 104. The statistics module 108 may perform various comparisons of the words, verified transliterations, and generated transliterations that may be included in a set of training data. The statistics module 108 further stores information corresponding to such comparisons as transliteration comparison information in the transliteration database 112.

The scoring module 110 may be configured to determine similarity scores between two words. In certain embodiments, the scoring module 110 calculates a base scoring component value for two words based on determining an edit distance between the two words. The scoring module 110 then calculates a weight based on comparing the two words with the transliteration comparison information stored in the transliteration database 112. The scoring module 110 determines a final similarity score in part by adjusting the base scoring component value according to the calculated weight. According to one or more embodiments, the similarity score between two words is given by Formula 1, where S1 corresponds to a first word of the two words being compared, S2 corresponds to a second word of the two words, and maxlength(S1, S2) refers to the word (out of S1 and S2) with the greater length in characters.

$$\text{Similarity Score} = \left(1 - \frac{\text{scoring\_component\_value}(S1, S2)}{\text{max}length(S1, S2)}\right) * 100 \quad \text{Formula I}$$

As shown in Formula 1, the score between two words depends in part on the scoring_component_value variable. Therefore, how the scoring_component_value variable is calculated affects the final score. As previously discussed, traditional scoring mechanisms tend to overestimate differences between words in certain situations, sometimes by overvaluing this variable. As will be discussed in more detail below, certain embodiments of the disclosure enable a more precise calculation of this variable so as to prevent the aforementioned overestimation of differences.

The transliteration database 112 stores transliteration comparison information and substring information. As describe in more detail below, the transliteration comparison information and the substring information may be statistical information regarding various substrings and substring pairs identified from the set of training data. The transliteration database 112 may be included in the service provider 102 or may be a remote database accessible by the service provider server 102.

The communication component 114 may be configured to communicate with various other devices, such as the user computer 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer 120, which includes a user application 122, other applications 124, database 126, and communication component 128. According to one or more embodiments, the user computer 120 may provide, via the user application 122, an input text to the service provider server 102. As previously discussed, the input text could be an Internet search term, information included in a payment transaction, and/or any other text data used in a search. In response, the service provider server 102 may be configured perform the phonetic matching algorithm using the input text with respect to other textual information, such as textual information included in one or more webpages, lists, blacklists, and/or the like.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
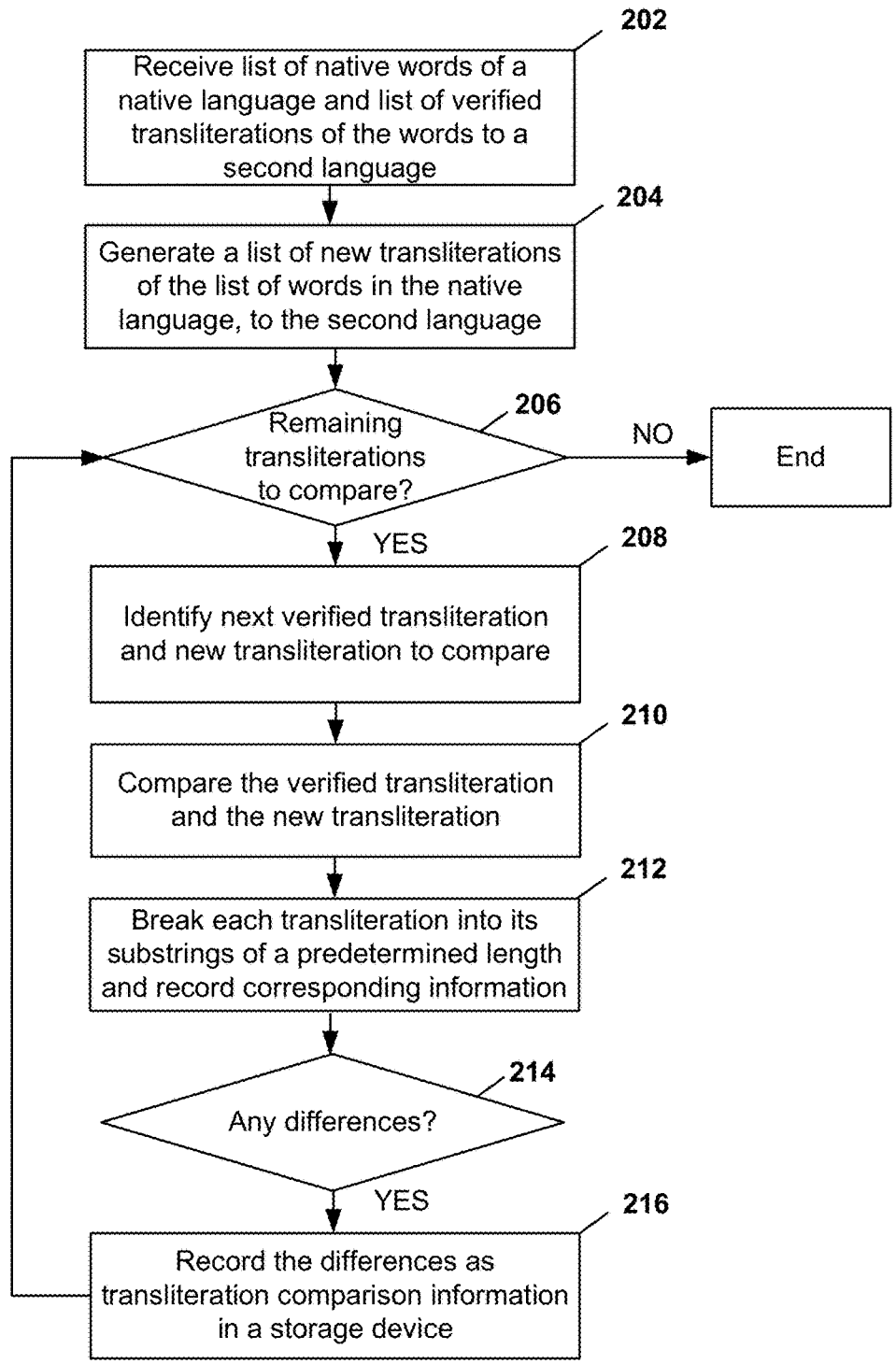
FIG. 2 illustrates a flow diagram illustrating a method for recording transliteration comparison information, according to some embodiments.
Figure 3:
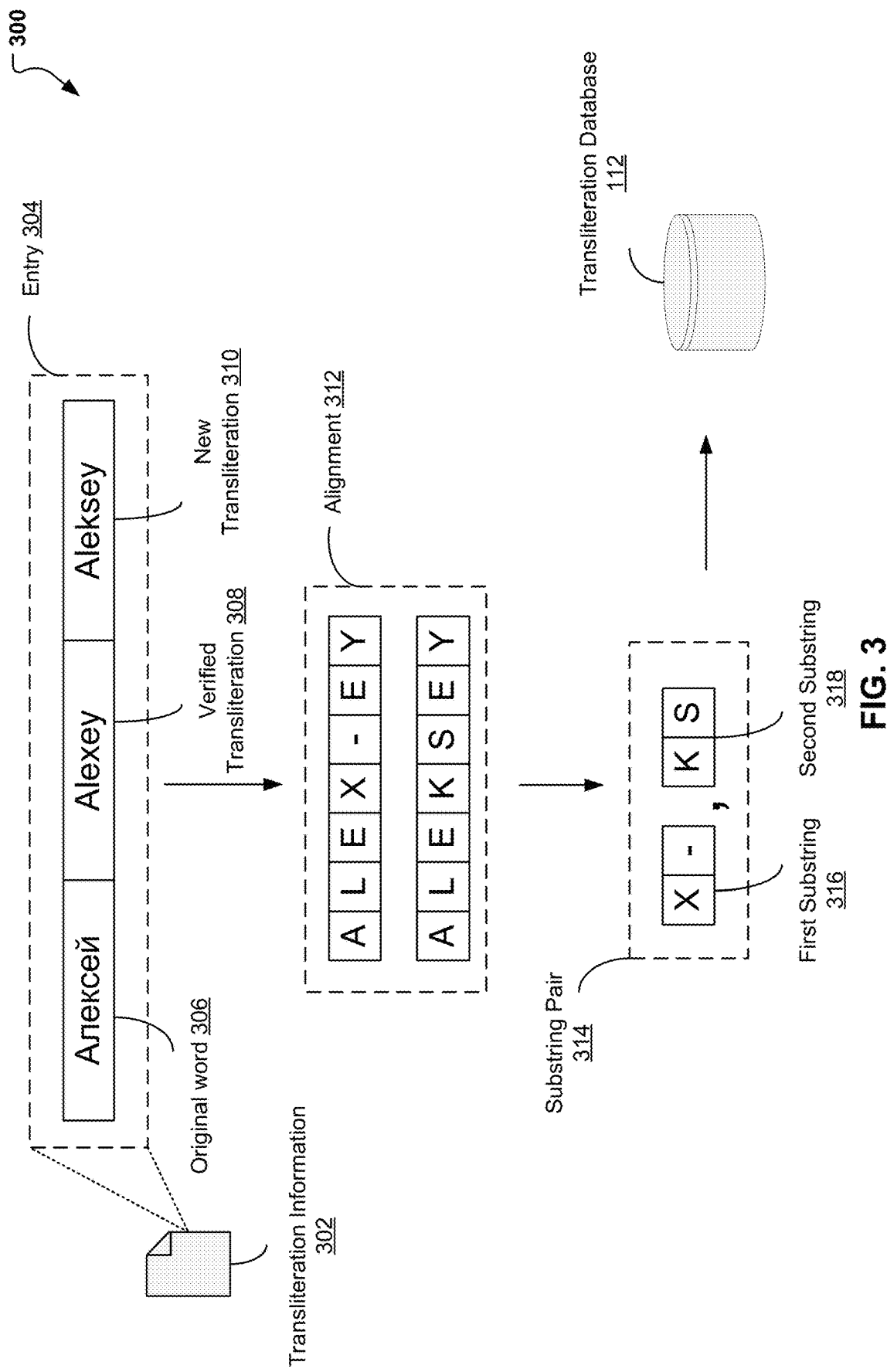
FIG. 3 illustrates an example diagram of comparing transliterations of a given word, according to some embodiments.

FIG. 2 illustrates an example flow diagram of a method 200 for recording transliteration comparison information that is used to determine phonetic similarity between words, according to some embodiments. FIG. 3 illustrates a diagram of example transliteration comparison information being identified and recorded. FIG. 2 is described in conjunction with FIG. 3, with additional references to the components depicted in FIG. 1.

The method 200 begins at step 202, where the service provider server 102 receives a set of native words of a native language and a set of verified transliterations of the native words to a second language. As used herein, a verified transliteration of a native word refers to a transliteration of the native word that has previously been determined to be a valid transliteration. In a particular embodiment, verified transliterations may be transliterations generated by a third-party, such as an open source transliteration engine.

At step 204, the transliteration module 104 may create set of new transliterations corresponding to the set of word of the native language. It will be appreciated that while the following description refers to the set of new transliterations as transliterations generated by the transliteration module 104, in other embodiments, the set of new transliterations may be transliterations generated by any source that is different from the source that generated the set of verified transliterations.

Similar to the set of verified transliterations, the set of new transliterations may also be of the second language. Thus, for each word in the set of words of the native language, the transliteration module 104 may generate a new respective transliteration to the second language. As a result, each word of the set of words of the native language may be associated with two respective transliterations: a respective verified transliteration and a respective new transliteration generated by the transliteration module 104. Such information may be collectively referred to as transliteration information. The transliteration information may be stored in table, such as shown below in Table 1. It will be appreciated that although the transliteration information is shown as being stored in a table, other types of data structures are also possible. Further, it will also be appreciated that while various descriptions in the disclosure may refer to the native words being Cyrillic words and the transliterations being English transliterations, these descriptions are merely examples, and the concepts described herein are applicable to other combinations of languages as well.

TABLE 1

| Native Word | Verified Transliteration | New Transliteration |
|---|---|---|
| Алексей | Alexey | Aleksey |
| Ελένη | Helen | Elena |
| Δάφνη | Daphne | Dafni |
| Κλειώ | Clio | Kleio |
| Юрий | Yuri | Yuriy |
| Евгений | Yevgeny | Yevgenii |

Steps 206-214 describe a process by which the set of verified transliterations and the set of new transliterations are compared with each other, where the results of the comparisons are stored as transliteration comparison information, such as in the transliteration database 112. At step 206, a check may be performed, such as by the statistics module 110, to determine whether there are any remaining transliterations to compare among the set of verified transliterations and the set of new transliterations. For instance, the statistics module 110 may access the table storing the transliteration information and analyze the table to compare the verified transliteration and the new transliteration of each entry of the table. In a particular embodiment, the statistics module 110 may iterate through the entries of the table storing the transliteration information to identify each verified transliteration and new transliteration. If the statistics module 110 determines there are no more transliterations to compare, the method 200 ends.

If the statistics module 110 determines there are remaining transliterations to compare, at step 208, the statistics module 110 identifies the next verified transliteration and the next new transliteration to compare. FIG. 3 depicts an example entry 304 from transliteration information 302 having an original word 306 (Алексей), a verified transliteration 308 (Alexey), and a new transliteration 310 (Aleksey). As previously discussed, the transliteration information 302 may be stored in a table or other type of data structure. In the example illustrated in FIG. 3, the statistics module 110 identifies, from the transliteration information 302, verified transliteration 308 and new transliteration 310 as the next verified transliteration and the next new transliteration to compare.

At step 210, the verified transliteration and the new transliteration is compared. For example, the statistics module 110 may provide verified transliteration 308 and new transliteration 310 to the alignment module 106, which may be configured to perform an alignment 312 with respect to verified transliteration 308 and new transliteration 310. As described above, the alignment module 106 may execute a sequence alignment algorithm such as the Needlemen-Wunsch algorithm, though other sequence alignment algorithms are also possible.

At step 212, the alignment module 106 breaks each of the transliterations into substrings of a predetermined length and records corresponding information regarding those substrings. For example, in FIG. 3, the predetermined substring length may be configured to be two. As such, the verified transliteration 308 "Alexey" may be broken into substrings of "Al", "le", "ex", "xe", and "ey", while new transliteration 310 "Aleksey" is broken into the substrings of "Al", "le", "ek", "ks", "se", and "ey". The statistics module 108 may maintain a count of respective occurrences of each identified substring as it is identified in the transliteration information 302. These substrings and their associated counts may be recorded in the transliteration database 112 as sub string information. For example, each time the substring "Al" is identified in a verified transliteration or new transliteration, the statistics module 108 may update the count associated with the substring "Al" by one. It will be appreciated that the substring length of two is merely an example, and that other substring lengths may be used and their associated counts recorded.

At step 214, the alignment module 106 may, based on the alignment, determine whether there are any differences between the verified transliteration and the new transliteration. In a particular embodiment, the verified transliteration and the new transliteration may be positionally compared (e.g., based on the alignment) using the predetermined substring length. Thus, as shown in the example depicted in FIG. 3 in which the predetermined substring length is two, and the verified transliteration 308 and new transliteration 310 are positionally compared to identify potential differences. For example, the substring "Al" of "Alexey" is compared with the substring "Al" of "Aleksey", the sub string "le" of "Alexey" is compared with the sub string "le" of "Aleksey", and so on. Based on this comparison, the alignment module 106 identifies a difference between verified transliteration 308 and new transliteration 310 as a substring pair 314 (e.g., the pair of strings "x-" and "ks"). The substring pair 314 includes a first substring 316 ("x-") from the verified transliteration 308 and a second substring 318 ("ks") from the new transliteration 310. Thus, the substring pair 314 indicates an instance in which the first substring 316 is used interchangeably with the second substring 318 to transliterate the same original word of the native language.

At step 216, the identified difference may be recorded as transliteration comparison information and may be stored in a storage device, such as the transliteration database 112. For example, the statistics module 110 may store the substring pair 314 in the transliteration database 112 and maintain a count of the number of instances where the particular sub string pair 314 (e.g., the pair of "x-" and "ks") has been identified as a difference between transliterations included in the transliteration information 302. The statistics module also maintains respective counts for other substring pairs that are identified as differences between transliterations included in the transliteration information 302. Thus, the transliteration comparison information stored in the transliteration database 112 stores various substring pairs and their associated counts.

Figure 4:
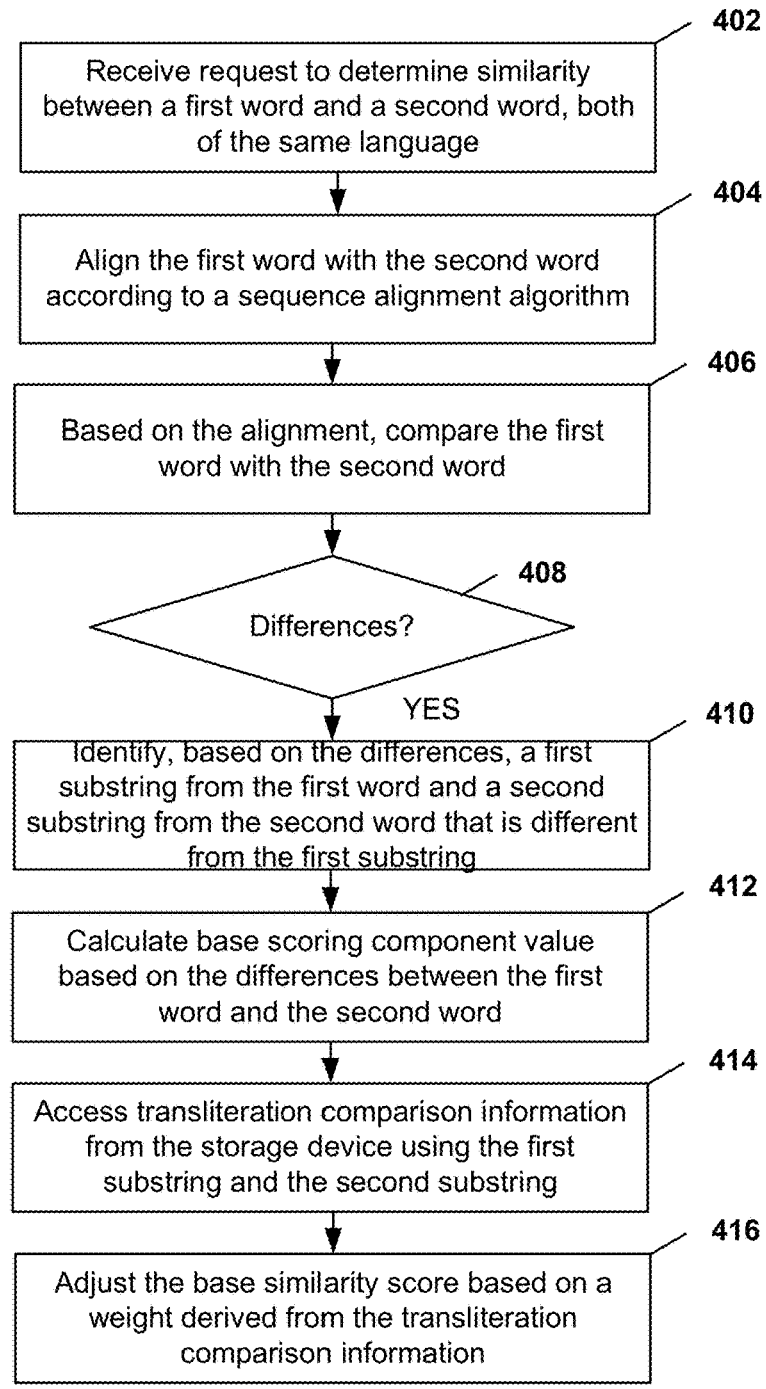
FIG. 4 is a flow diagram illustrating a method for determining a similarity score using transliteration comparison information, according to some embodiments.
Figure 5:
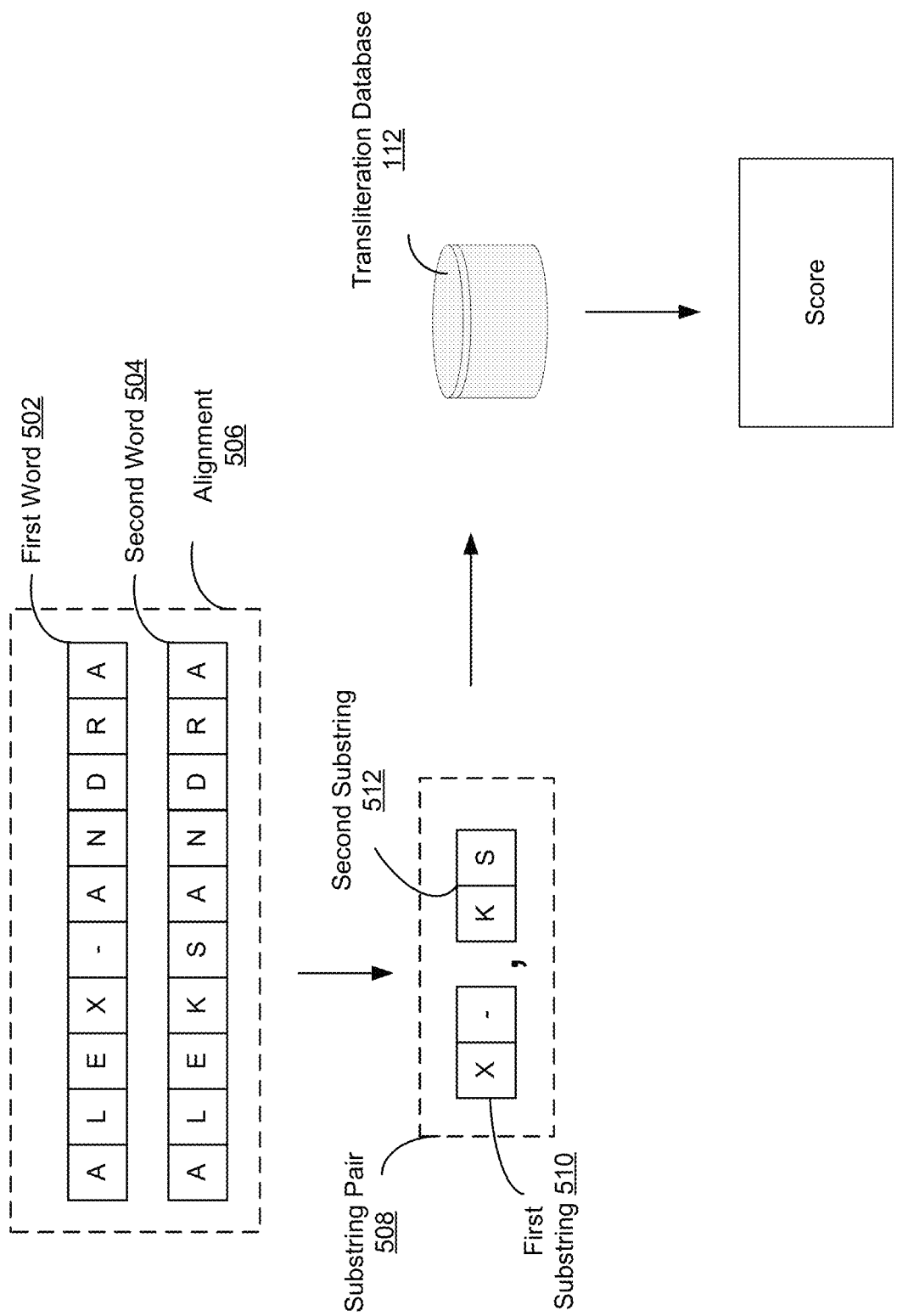
FIG. 5 illustrates an example diagram of determining a similarity score between two example words, according to some embodiments.

FIG. 4 illustrates an example flow diagram of a method 400 for determining a similarity score between two strings, according to some embodiments. FIG. 5 illustrates a diagram of scoring two example transliterations based on transliteration comparison information. FIG. 4 is described in conjunction with FIG. 5, with additional references to the components depicted in FIG. 1.

The method 400 begins at step 402, where the service provider server 102 receives a request to determine a similarity between two strings (e.g., two words). The two words may include a first word 502 ("Alexandra) and a second word 504 ("Aleksandra"). At step 404, the first word 502 and the second word 504 may be aligned according to a sequence alignment algorithm. For instance, the alignment module 106 may align the first word 502 and the second word 504 according to the Needlemmen-Wunsch algorithm, though other algorithms are also possible.

At step 406, based on the alignment 506, the alignment module 106 may compare the first word 502 with the second word 504 and determine, at step 408, whether there are any differences between the first word 502 and the second word 504. If there are differences between the first word and the second word, the method 400 proceeds to step 410. For instance, the first word 502 and second word 504 may be positionally compared using the predetermined substring length that was described with reference to FIG. 2 and FIG. 3 and that was used to record the substring information and transliteration comparison information in the transliteration database 112.

At step 410, based on the differences, a first substring from the first word and a second substring from the second word are identified. The second substring is different from the first substring and both the second substring and the first substring are of the predetermined substring length. For instance, in the example of FIG. 5, the alignment module 106 identifies the substring pair 508 based on the alignment 506. The substring pair 508 includes first substring 510 ("x-") and second substring 512 ("ks"). Notably, first substring 510 and second substring 512 are the same as first substring 316 and second substring 318, respectively. As a result, substring pair 508 is the same as substring pair 314.

At step 412, the scoring module 110 calculates a base scoring component value based on the differences between the first word and the second word. According to a particular embodiment, the base scoring component value may be determined by calculating an edit distance between the first word and the second word. In the example shown in FIG. 5, the edit distance between first word 502 ("Alexandra") and second word 504 ("Aleksandra") is 2.

At step 414, transliteration comparison information from the storage device (e.g., transliteration database 112) is accessed using the first substring and the second substring, and at step 416, the base scoring component value is adjusted based on a weight derived from the transliteration comparison information. For example, in order to calculate the weight, the scoring module 110 may be configured to access transliteration comparison information associated with the substring pair 508. More particularly, the scoring module 110 may use the substring pair 508 as a key into the transliteration database 112 to determine the count associated with the substring pair 508. As described previously with respective FIG. 2 and FIG. 3, the count was previously recorded for the corresponding substring pair 314 (which is the same as substring pair 508) based on a number of occurrences the substring pair 314/508 occurred in the transliteration information 302. Similarly, the scoring module 110 may also use the individual substrings that make up the subring pair 508 as additional keys into the transliteration database 112 to extract substring information associated with the first substring 510 and the second substring 512. Accordingly, the scoring module 110 may determine respective counts associated with the first substring 510 and the second substring 512, that were previously recorded.

According to certain embodiments, the scoring module 110 may use the respective counts determined for the substring pair 508, the first substring 510, and the second substring 512 to calculate a weight to apply to the base scoring component value. For example, the weight may be calculated based on the equation shown in Formula 2 below.

$$\text{Weight} = \text{Max}\left(\frac{\text{Count of substring pair}}{\text{Count of first substring}}, \frac{\text{Count of substring pair}}{\text{Count of second substring}}\right) \quad \text{Formula 2}$$

The scoring module 110 calculates a modified scoring component value by applying the weight to the base scoring component value. The modified scoring component value maybe determined based on the equation shown in Formula 3 below, where modified SCV corresponds to the modified scoring component value and base_SCV corresponds to the base scoring component value.

$$\text{modified\_SCV}(S1,S2) = \text{base\_SCV}(S1,S2)*(1-\text{Weight}) \quad \text{Formula (3)}$$

Assuming for illustrative purposes that count of substring pair=100, count of first substring=120, and count of second substring=150, S1 corresponds to first substring 510, and S2 corresponds to second substring 512, then the weight and modified SCV are solved for as follows:

$$\text{weight} = \text{Max}\left(\frac{100}{120}, \frac{100}{150}\right) = \text{Max}(0.833, 0.633) = 0.833$$

$$\text{modified\_SCV} = 2*(1-0.833) = 0.34$$

If the modified SCV is substituted for the scoring_component_value variable of Formula 1, then the similarity score is solved for as follows:

$$\text{Similarity Score} = \left(1 - \frac{0.34}{\text{maxlength}(9,10)}\right)*100 = (1-0.034)*100 = 96.6$$

As a point of comparison, if the base SCV was instead substituted for the scoring_component_value variable of Formula 1, then the similarity score would have been solved for as follows:

$$\text{Similarity Score} = \left(1 - \frac{2}{\text{maxlength}(9,10)}\right)*100 = (1-0.2)*100 = 80$$

As shown above, if the similarity score was calculated for the first word 502 and second word 504 without taking into account the transliteration comparison information, the score would be 80. On the other hand, taking into account the transliteration comparison information, the similarity score is calculated to be 96.6. Such an outcome may be desirable because first word 502 and second word 504 are both English transliterations of the same word in Cyrillic. Thus, the similarity score between first word 502 and second word 504 should be relatively high. In this manner, the phonetic matching algorithm described herein is able to, in certain circumstances, to correct for overestimation of differences between words by typical systems.

Example Computing Device

Figure 6:
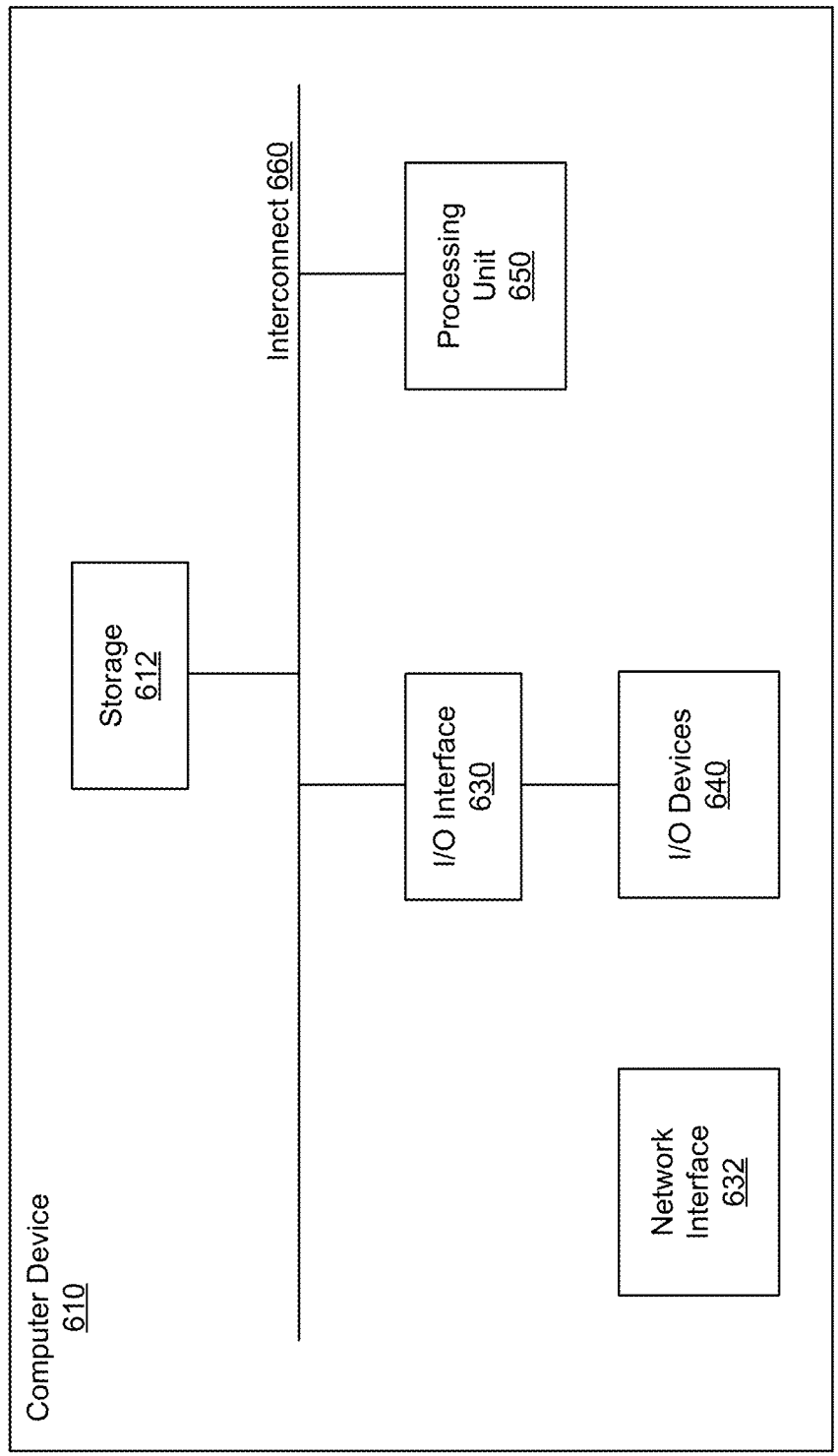
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   one or more hardware processors; and
   a memory storing computer-executable instructions, that in response to execution by the one or more hardware processors, causes the system to perform operations comprising:
   accessing training data that includes a set of words of a first language, each word in the set of words of the first language associated with a first respective transliteration of the word in a second language and a second respective transliteration of the word in the second language;
   recording, based on analyzing the training data, a number of times a first substring of the second language is used interchangeably with a second substring of the second language for transliterating a respective word from the set of words of the first language; and
   determining a similarity score between a first word of the second language and a second word of the second language, the determining the similarity score comprising:
   calculating a base scoring component value based on a number of characters that are different between the first word and the second word;
   identifying that the first word includes the first substring and the second word includes the second substring;
   calculating a weight based on the number of times the first substring is used interchangeably with the second substring; and
   generating a modified scoring component value by adjusting the base scoring component value according to the calculated weight.

2. The system of claim 1, wherein the analyzing the training data further comprises:
   performing a sequence matching algorithm between two words of the second language.

3. The system of claim 1, wherein the calculating the weight further comprises:
   comparing a first ratio with a second ratio, the first ratio being a ratio between the number of times the first substring is used interchangeably with the second substring and a number of times the first substring is included in the training data, and the second ratio being a ratio between the number of times the first substring is used interchangeably with the second substring and a number of times the second substring is included in the training data.

4. The system of claim 3, wherein the operations further comprise:
   based on the comparing, determining that the first ratio is greater than the second ratio; and
   calculating the weight based on the first ratio.

5. The system of claim 1, wherein the modified scoring component value is greater than the base scoring component value.

6. The system of claim 1, wherein a length of the first substring is equal to a length of the second substring.

7. The system of claim 1, wherein the determining the similarity score is performed based on determining an edit distance value between the first word and the second word, and wherein the adjusting the base scoring component value further comprises reducing the edit distance value between the first word and the second word based on the calculated weight.

8. The system of claim 1, wherein the operations further comprise:
   receiving a list of blacklisted names;
   identifying a transaction associated with a user having a particular name; and
   determining whether the list of blacklisted names includes the particular name by comparing the particular name with a second name included in the list of blacklisted names, wherein the comparing comprises the determining the similarity score between the first word and the second word, the particular name being the first word and the second name being the second word.

9. The system of claim 1, wherein the first word corresponds to a search term included in a search request, and the second word is included in an electronic document being searched in response to the search request.

10. A method, comprising:
    accessing, by a computer comprising one or more hardware processors, training data that includes a first set of words of a native language and a second set of words corresponding to verified transliterations of the first set of words from the native language to a target language;
    generating, by a transliteration module being executed by the one or more hardware processors, a set of new transliterations of the first set of words from the native language to the target language;
    storing comparison information based on a comparison between words from the second set of words and words from the set of new transliterations of the first set of words;
    determining, based on the comparison information, a similarity score between a first word of a first entity in the target language and a second word of a second entity in the target language, the second entity being included in a blacklist, the determining the similarity score comprising:
    calculating a base scoring component value based on a number of characters that are different between the first word and the second word;
    identifying a first substring from the first word and a second substring from the second word;
    calculating a weight based on a number of times the first substring is used interchangeably with the second substring; and
    generating a modified scoring component value by adjusting the base scoring component value according to the calculated weight;
    determining, in response to the similarity score exceeding a predefined threshold, that the first entity is a same entity as the second entity; and identifying, in response to determining that the first entity is the same entity as the second entity, a transaction associated with the first entity for fraud.

11. The method of claim 10, wherein the storing the comparison information comprises:
for each word included in the first set of words:
identifying a corresponding transliteration from the second set of words and a second corresponding transliteration from the set of new transliterations;
determining whether the corresponding transliteration and the second corresponding transliteration are different; and
recording one or more differences between the corresponding transliteration and the second corresponding transliteration if the corresponding transliteration and the second corresponding transliteration are different.

12. The method of claim 11, wherein the determining whether the corresponding transliteration and the second corresponding transliteration are different comprises:
aligning the corresponding transliteration and the second corresponding transliteration according to a sequence alignment algorithm.

13. The method of claim 12, wherein the recording one or more differences comprises:
based on the aligning, identifying a first substring from the corresponding transliteration and a second substring from the second corresponding transliteration, the first substring and the second substring being different; and
in response to the identifying, recording an instance of the first substring being used interchangeably with the second substring.

14. The method of claim 10, wherein the determining similarity score between the first word and the second word further comprises:
calculating, based on a comparison between the first word and the second word, an edit distance corresponding to the first word and the second word; and
adjusting the edit distance based on the calculated weight.

15. The method of claim 14, wherein the first word includes a first number of characters and the second word includes a second number of characters, and wherein the similarity score is based on the adjusted edit distance, the first number of characters, and the second number of characters.

16. A non-transitory computer readable medium storing computer-executable instructions that in response to execution by one or more hardware processors, causes a payment provider system to perform operations comprising:
accessing data corresponding to a first set of words of a native language, a second set of words corresponding to verified transliterations of the first set of words from the native language to a target language, and a set of new transliterations of the first set of words from the native language to the target language;
storing comparison information based on a comparison between words from the second set of words and words from the set of new transliterations of the first set of words;
determining, based on the comparison information, a similarity score between a first word of a first entity in the target language and a second word of a second entity in the target language, the second entity being included in a blacklist, the determining the similarity score comprising:
calculating a base scoring component value based on a number of characters that are different between the first word and the second word;
identifying a first substring from the first word and a second substring from the second word;
calculating a weight based on a number of times the first substring is used interchangeably with the second substring; and
generating a modified scoring component value by adjusting the base scoring component value according to the calculated weight;
determining, in response to the similarity score exceeding a predefined threshold, that the first entity is a same entity as the second entity; and
flagging, in response to determining that the first entity is the same entity as the second entity, a transaction associated with the first entity for fraud.

17. The non-transitory computer readable medium of claim 16, wherein the storing the comparison information comprises:
for each word included in the first set of words:
identifying a corresponding transliteration from the second set of words and a second corresponding transliteration from the set of new transliterations;
determining whether the corresponding transliteration and the second corresponding transliteration are different; and
recording one or more differences between the corresponding transliteration and the second corresponding transliteration if the corresponding transliteration and the second corresponding transliteration are different.

18. The non-transitory computer readable medium of claim 17, wherein the determining whether the corresponding transliteration and the second corresponding transliteration are different comprises:
aligning the corresponding transliteration and the second corresponding transliteration according to a sequence alignment algorithm.

19. The non-transitory computer readable medium of claim 18, wherein the recording one or more differences comprises:
based on the aligning, identifying a first substring from the corresponding transliteration and a second substring from the second corresponding transliteration, the first substring and the second substring being different; and
in response to the identifying, recording an instance of the first substring being used interchangeably with the second substring.

20. The non-transitory computer readable medium of claim 16, wherein the determining the similarity score between the first word and the second word further comprises:
calculating, based on a comparison between the first word and the second word, an edit distance corresponding to the first word and the second word; and
adjusting the edit distance based on the calculated weight.

* * * * *